US007891675B2

(12) United States Patent
Dobra et al.

(10) Patent No.: US 7,891,675 B2
(45) Date of Patent: Feb. 22, 2011

(54) APPARATUS FOR TRANSPORTING PRODUCTS IN CRATES OR CONTAINERS

(75) Inventors: Boris Dobra, Scoresby (AU); John Clifton Leahy, Rowville (AU)

(73) Assignee: Checkmate International Pty Ltd., Huntingdale, Victoria (AU)

( * ) Notice: Subject to any disclaimer, the term of this patent is extended or adjusted under 35 U.S.C. 154(b) by 43 days.

(21) Appl. No.: 12/065,873

(22) PCT Filed: Sep. 5, 2006

(86) PCT No.: PCT/AU2006/001290

§ 371 (c)(1),
(2), (4) Date: Sep. 2, 2008

(87) PCT Pub. No.: WO2007/028194

PCT Pub. Date: Mar. 15, 2007

(65) Prior Publication Data

US 2008/0315537 A1 Dec. 25, 2008

(30) Foreign Application Priority Data

Sep. 5, 2005 (AU) .............................. 2005904855

(51) Int. Cl.
*B62D 21/14* (2006.01)
(52) U.S. Cl. .............. 280/43.12; 280/43.14; 280/43.24; 280/6.155; 188/5; 108/57.33; 108/54.1

(58) Field of Classification Search ..................... 188/5, 188/19; 280/43, 43.12, 43.14, 43.2–43.24, 280/6.15, 6.155, 755, 79.2; 108/57.19, 54.1, 108/53.4, 57.33, 56.1, 56.3, 57.15
See application file for complete search history.

(56) References Cited

U.S. PATENT DOCUMENTS 2,185,073 A   12/1939   Chamberlain
(Continued)

FOREIGN PATENT DOCUMENTS

EP   0262592 A2   4/1988
(Continued)

*Primary Examiner*—J. Allen Shriver, II
*Assistant Examiner*—Erez Gurari
(74) *Attorney, Agent, or Firm*—Merchant & Gould P.C.

(57) ABSTRACT

Apparatus for transporting products including a body having ground wheels (22, 122) and support structure (30, 130) for one or more crates or other containers holding products to be carried by the apparatus. At least one ground engageable member (40, 140) fixed to said support structure forms an assembly with the support structure that is mounted to the body for relative movement between a retracted position in which the apparatus is freely moveable on a ground surface by means of the ground wheels and a relatively downwardly extended position in which the ground engageable member engages an underlying ground surface at a predetermined location to stabilize the apparatus against movement from that location on the ground wheels. Releasable latching means (60, 190, 192) is provided to latch the ground engageable member in the retracted position, and there is at least one transverse opening (59, 159) in the ground engageable member to receive a fork or forks of a lifting device, for lifting the apparatus with the ground engageable member resting on the fork(s), whereby to facilitate transport of the apparatus and/or release and engagement of the latching means.

25 Claims, 9 Drawing Sheets

U.S. PATENT DOCUMENTS

| | | | |
|---|---|---|---|
| 2,511,073 A | | 6/1950 | McCandless |
| 2,628,068 A | * | 2/1953 | Sehnert .................... 254/10 C |
| 2,682,068 A | | 2/1953 | Sehnert |
| 3,194,346 A | | 7/1965 | Stentz et al. |
| 4,417,738 A | * | 11/1983 | Kendall .................. 280/43.17 |
| 4,598,828 A | | 7/1986 | Young et al. |
| 5,366,090 A | * | 11/1994 | Schutz ...................... 206/599 |
| 5,628,522 A | * | 5/1997 | Hall ........................ 280/43.17 |
| 7,322,586 B1 | * | 1/2008 | Zettel ..................... 280/47.26 |

FOREIGN PATENT DOCUMENTS

| | | |
|---|---|---|
| WO | WO 98/19903 | 5/1998 |
| WO | WO 2005/112710 A1 | 12/2005 |

\* cited by examiner

APPARATUS FOR TRANSPORTING PRODUCTS IN CRATES OR CONTAINERS

FIELD OF THE INVENTION

This invention relates generally to the logistics of packing, distribution and merchandising of products, and more particularly is concerned with systems for transporting products and displaying them for sale.

BACKGROUND OF THE INVENTION

Typically products are transported to retail stores in crates, trays or cardboard boxes, which provide an effective means by which to transport large quantities of product and also protect the product while in transit. At the store, the contents are removed from the container, placed on a trolley, pushed to the point of sale and placed one at a time on the shelf. The packaging is usually destroyed or recycled. As product is sold the older stock is pulled forward and new stock placed behind the older product.

Maintaining full and faced up shelves requires considerable time and is very labour intensive. More recently, shelves have been fitted with dividers and/or a slip surface so that shelves can be angled to gravity feed. This reduces the time taken to manage product as stock does not need to be pulled forward as it is sold and can be rotated when new product is loaded at the rear. This has reduced the time taken to merchandise products in the store but has a number of disadvantages. In particular, the removal of product one by one from the packaging, placement on a trolley for transport to the shelf and subsequent loading onto the shelf remains a labour intensive task. It would be advantageous if the process of transport, unpacking, shelf filling and shelf maintenance could be streamlined and made less labour intensive.

By way of example, milk is presently brought to stores in crates. Crates provide an effective means for transporting high volumes of milk and also protect the product while in transit. Large numbers of crates can be stacked on pallets for efficient handling by forklifts and pallet jacks at production plants and distribution centres. On arrival at the store, the milk cartons or bottles are taken one at a time out of the crates and placed on dairy case shelves. Empty crates are stacked on top of each other but do not nest so they consume valuable space in the retail store. Later they are collected by the supplier and cleaned on return to the factory.

As milk is sold, new stock is loaded onto the shelf. The older dated stock is pulled forward so milk does not become outdated. Handling milk in this manner is labour intensive and costly. It is also difficult to keep the shelves clean. It would be desirable if the logistics involved a transport merchandising system which transported the milk to the store in shelf-ready packaging that could be placed straight on the shelf ready to gravity feed to the front of the shelf as forward product is taken by customers.

One attempted improvement was to place the loaded milk crates on a mobile platform or dolly in front of cool room doors. Customers lifted the milk directly out of the crates. However, this system poorly presents the milk. It was difficult to remove the larger bottles of milk from the crates and stock rotation was a problem.

More recently, some retailers have replaced crates on dollies with milk rear-loaded into gravity-feed shelves in milk racks or gravity-feed shelves in mobile trolleys. The shelves have dividers with slip surfaces to separate and gravity feed the milk. This system has superior milk presentation, better customer identification and selection and improved stock rotation of the milk. However, the system requires each milk pack to be lifted by hand out of the crate and individually loaded into the back of the shelf of the rack or trolley, which is also labour intensive. As well, dividers become soiled and are difficult to clean.

The present applicant's international patent publication WO2005/112710 discloses a product merchandising system in which product crates are transported from a supplier or distribution centre in a stack on a dolly that is configured to tilt the stack at the retail store to provide a gravity-feed display on the dolly from which customers can take the product. The product is not separately handled between supplier or distribution centre and customer, significantly reducing labour costs.

U.S. Pat. No. 2,628,068 describes an elevating truck having a main frame provided with castor wheels, and a lifting platform positioned within the main frame. The lifting platform is adapted to support equipment and is movable between a raised position and a ground-engaging position using a lifting mechanism comprising rotatable shafts and a pivot action.

International patent publication WO 98/19903 describes a portable cart that can be used to transport and move sensitive laser equipment. The portable cart includes a first frame support having spaced feet for selectively engaging the ground and a second frame support provided with wheels. The feet are outside the wheels. The first frame support is vertically movable relative to the second frame support by means of a motor.

Reference herein to any specific prior product, document or practice is not to be construed as an admission that the product, document contents or practice is common general knowledge, in Australia or elsewhere.

It is an object of this invention to contribute one or more improvements in the transport, distribution and merchandising of products in the retail supply chain.

SUMMARY OF THE INVENTION

The present invention stems from an appreciation that the transport and display of products in crates, cartons, trays and other containers that remain on dollies from supplier or distribution centre to retail stores can be further enhanced by providing apparatus that can be selectively configured as a dolly or handled collectively with conventional pallet systems.

In a first aspect, the invention provides a dolly apparatus for transporting products, comprising:

a body having ground wheels;

support structure for one or more crates or other containers holding products to be carried by the apparatus;

at least one ground engageable member fixed to said support structure, which member forms an assembly with said support structure that is mounted to said body for relative movement between a retracted position in which the apparatus is freely moveable on a ground surface by means of said ground wheels and a relatively downwardly extended position in which said at least one ground engageable member engages an underlying ground surface at a predetermined location to stabilise the apparatus against movement from that location on said ground wheels;

releasable latching means to latch said ground engageable member in said retracted position; and at least one transverse opening in said ground engageable member to receive a fork or forks of a lifting device, for lifting the apparatus with said ground engageable member resting on the fork(s), whereby to facilitate transport of the apparatus and/or release and engagement of said latching means.

Preferably, the body includes a chassis on which the ground wheels are mounted. The ground engageable member is preferably fixed to the support structure by linking structure extending through one or more openings in the chassis. In one arrangement, the linking structure is a plurality of spaced posts, in another a plurality of ribs.

In one form of the invention, the latching means comprises hand operable latching means for selectively determining at which of said retracted and extended positions the ground engageable member is disposed. This latching means may conveniently comprise a slide member, slidable between respective positions in which it supports said ground engageable member in a relatively elevated position corresponding to the retracted position of the ground engageable member, and a second position in which the ground engageable member is able to fall to bring the ground engageable member to its downwardly extended position. Preferably, the slide member is easily slidable between its respective positions only when the support structure and its load are supported by the lifting device.

In another form of the invention, the latching means comprises co-operable formations on one or more of said posts or ribs, and on a respective lateral opening in said body, whereby sufficient relative lateral movement of the body and the ground engageable member while the apparatus is held off the ground by the lifting device is effective to engage and disengage the co-operable shoulders.

Advantageously, the support structure includes a platform defining a seating plane for a crate, tray or other container that is inclined to the horizontal sufficiently for products thereon to slide forward in the crates under gravity as products at the front of the crate are removed from the crate. The platform may be adjustable between a first position in which it defines the inclined seating plane, and a second position in which it defines a generally horizontal seating plane.

BRIEF DESCRIPTION OF THE DRAWINGS

The invention will now be further described, by way of example only, with reference to the accompanying drawings, in which.

DESCRIPTION OF PREFERRED EMBODIMENTS

Figure 1:
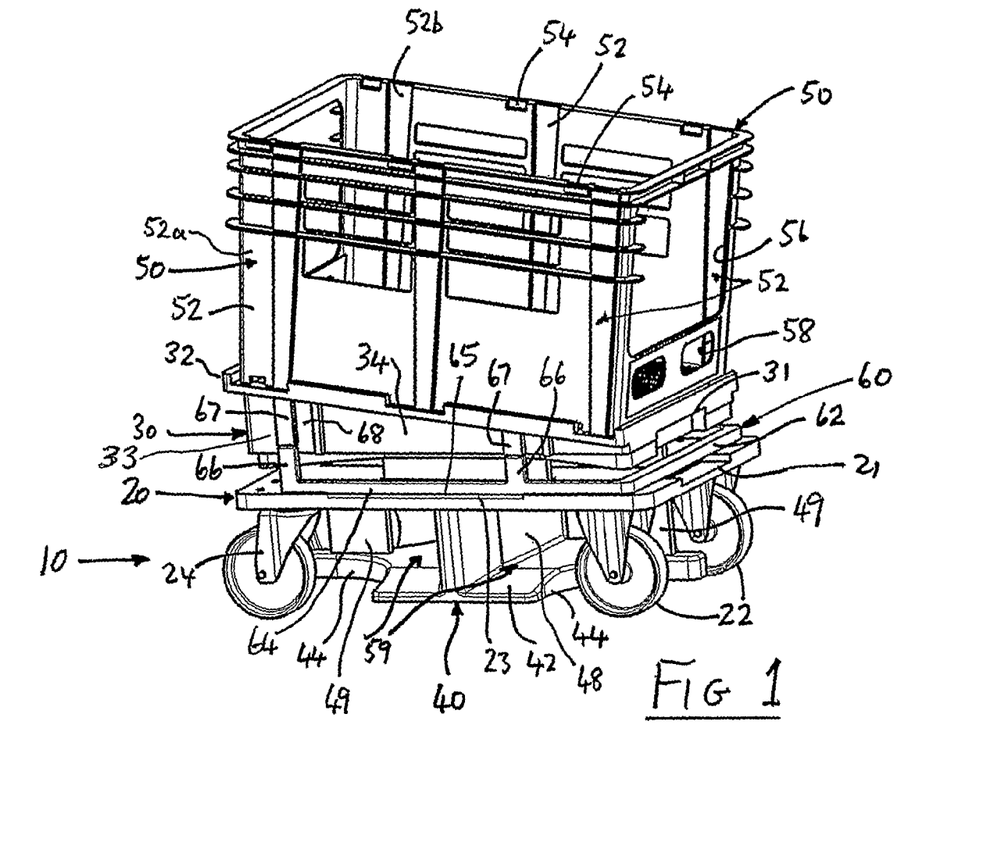
FIG. 1 is a perspective view of a product transportation apparatus according to a first embodiment of the invention shown in its freely moveable "dolly" condition, carrying one crate.
Figure 2:
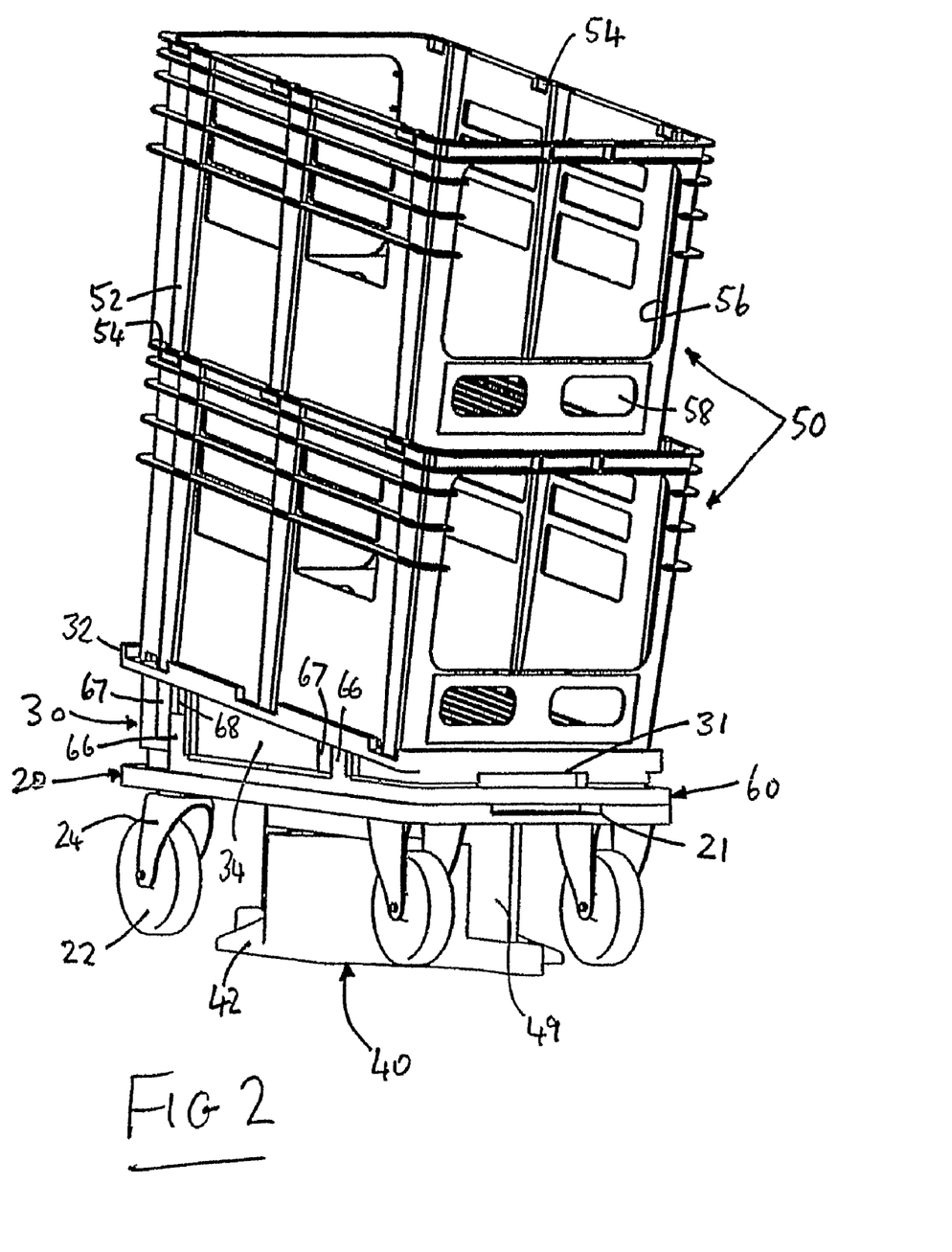
FIG. 2 is a similar view to FIG. 1 but from a slightly different position, showing the apparatus in its pallet transport configuration carrying several crates in a stacked configuration.

The product transportation apparatus 10 illustrated in FIGS. 1 to 6 has three principal components, ie. a chassis 20, crate support structure 30, and a ground engageable member in the form of a footplate 40. Chassis 20 has four ground wheels 22 supported in yokes 24 near its respective corners. Support structure 30 defines a peripherally lipped upper platform 32, for supporting a stack of crates 50. Platform 32 is sufficiently inclined for pre-determined products to be able to gravity-feed forwardly on the floors of crates 50. FIG. 2 illustrates two crates in the stack but there would typically be more. FIG. 1 shows a single crate. The arrangement of the crates will be discussed further below. Ground wheels 22 may be variously fixed or swiveling and one or more may be fitted with a foot- or hand-actuated brake.

Figure 3:
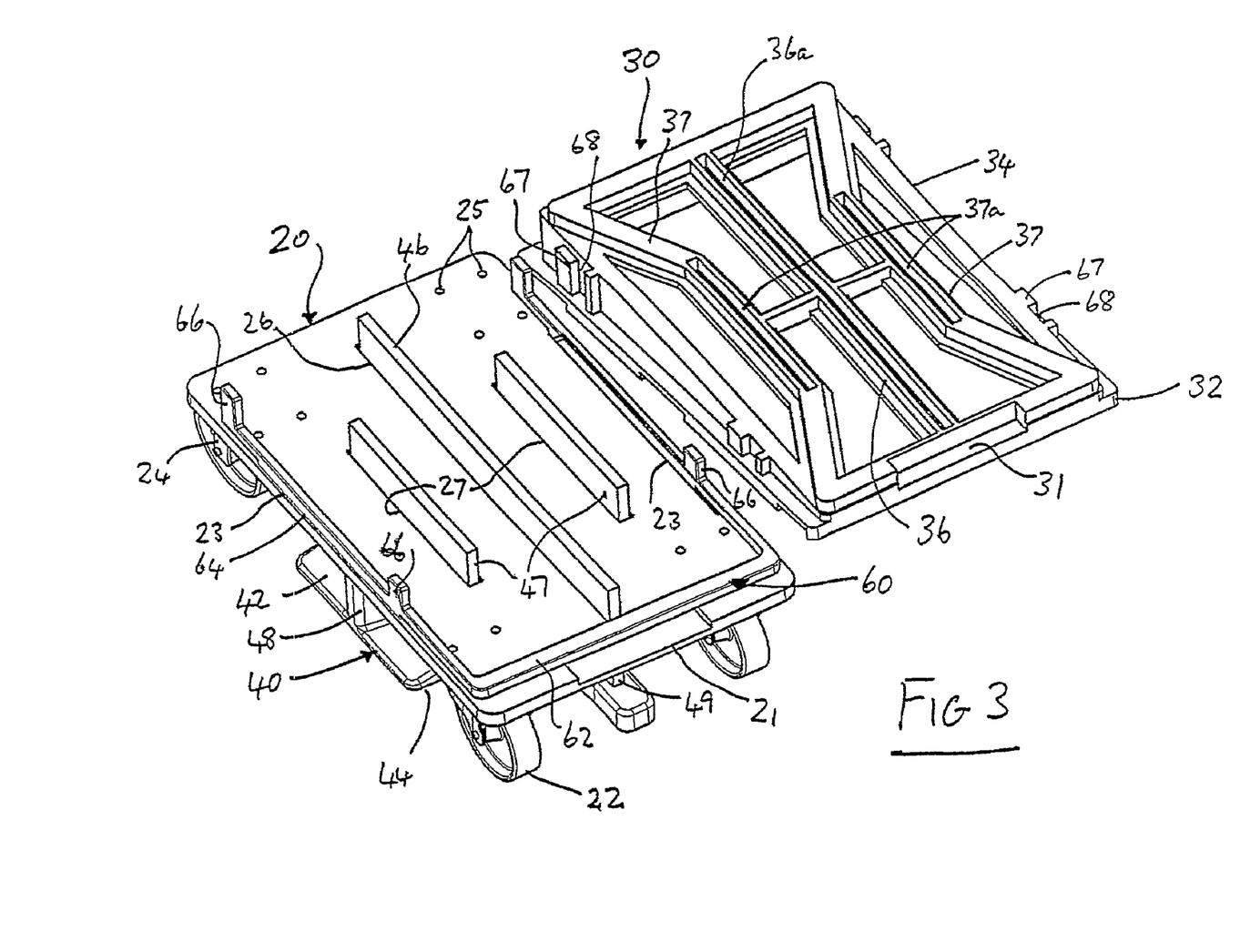
FIG. 3 is a disassembled view of the apparatus of FIG. 1 with the chassis viewed from above and the cradle separated and viewed from underneath.
Figure 4:
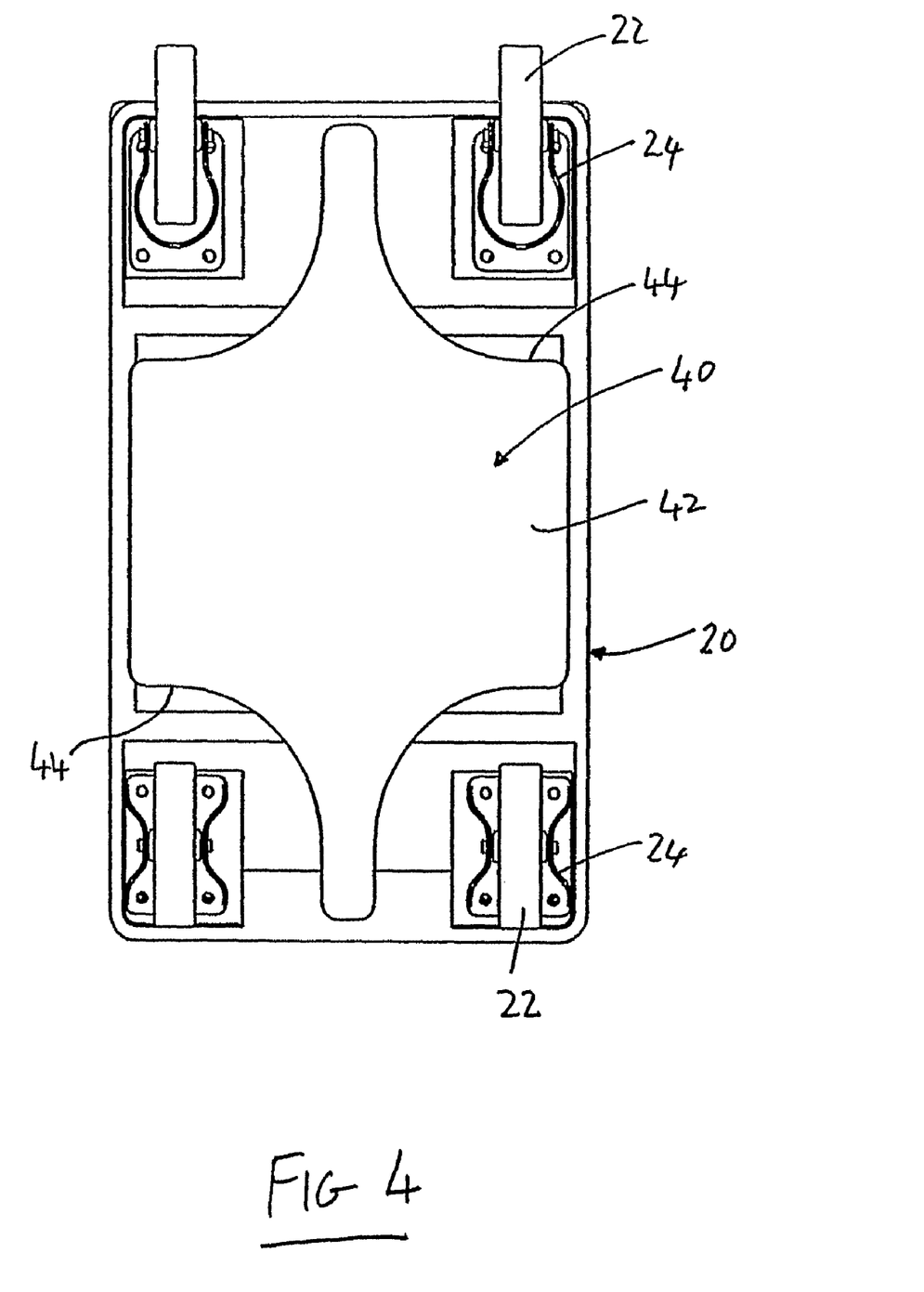
FIG. 4 is an underneath view of the apparatus of FIG. 1.

As best seen in FIG. 3, chassis 20 is a simple flat platform to which yokes 24 are fitted by respective bolts, rivets or other suitable fasteners 25 and in which are formed three parallel longitudinally extending slots 26, 27. These slots comprise a longer, centrally located slot 26 and a pair of slide slots 27. Slots 26, 27 provide the means by which footplate 40 is fixedly mounted to support structure 30 by link ribs 46, 47 that project through slots 26, 27, and by which the assembly of the footplate 40 and support structure 30 is able to move vertically between two positions (to be discussed).

Platform 32 is a flat plate and the balance of support structure 30 comprises a cradle 33 that consists of a rectangular depending rim 34 and within the rim, an array of three ribs, 36, 37 (FIG. 3) with slots 36a, 37a that receive ribs 46, 47. Link ribs 46, 47 are welded, snapped or clipped in place in slots 36a, 37a to rigidify the connection.

Footplate 40 comprises a baseplate 42, with corner cutaways to accommodate wheels 22, and three upstanding webs 48, 49 that rigidly link the baseplate 42 to ribs 46, 47. Web 48 extends transversely across the structure midway between the front and rear wheels 22, while webs 49 are aligned longitudinally between the yoke pairs at each end. The inner upright edges of webs 49 are spaced from transverse web 48 to define a pair of transverse openings 59 across the footplate 40 for receiving the forks of a forklift or pallet jack.

The assembly of cradle 33 and footplate 40 is moveable vertically in slots 26, 27 between a retracted or elevated position, depicted in FIGS. 1 and 3, in which footplate 40 is clear of the ground and ground wheels 22 freely support the apparatus on the ground surface for movement thereon, and a lowered or extended position in which baseplate 42 engages the ground and acts as a form of brake to stabilise the apparatus against movement for a predetermined location: this condition is depicted in FIG. 2. The respective positions are determined and maintained by a sliding latch member 60 which is U-shaped and extends around the sides and front end of chassis 20 and cradle 33. At the front, its crosspiece 62 may be grasped by hand for moving the latch member and this grasping is facilitated by recesses 21 and 31 in chassis platform 20 and cradle 33.

At the sides, longitudinally extending portions 64 of latch member 60 have a depending rib 65 by which it is retained in a matching slot 23 on platform 20, and a pair of upstanding tabs 60. These tabs 60 engage under complementary cleat 67 on cradle 33 in a rearward position of the latch member, thereby holding the assembly of the cradle 33 and footplate 40 in the retracted or elevated position. In a forward position of the latch member, tabs 66 are received into slots 68 situated alongside cleats 67, thereby allowing the cradle and footplate to drop. The latch member 60 can be moved between its two positions when the assembly of the cradle, its load and footplate 40 are supported by one or more forklift forks disposed in openings 59 to either take the load off tabs 66, or to lift the cradle to allow the tabs 66 to be brought under cleats 67.

It will be appreciated that when footplate 40 is in its retracted or elevated position, apparatus 10 is fully functional as a dolly, and the stack of crates is able to be freely moved about by pushing the dolly and its load on the ground wheels. However, when footplate 40 is descended to engage the ground, it acts as a brake and prevents the apparatus functioning as a dolly. Instead, it becomes a substantially stationary support for the crate stack, a kind of mini-pallet. With appropriate dimensioning of the apparatus, a set number eg. six of the mini-pallets may be transported within the dimensions of a standard pallet, but the pallet itself is not required. This will allow the individual mini-pallets to be loaded up with filled crates at a supplier or distribution centre, lifted by forklift and loaded into a truck for delivery to a distribution centre, supermarket or other store. At the retail outlet, the mini-pallets can be released to their dolly positions, by elevating the ground engageable members, and wheeled into position in a cold room or refrigerator. At this point, by virtue of the inclination of platform 32, the crates 50 gravity-feed the products as they are taken from the front by store customers. The invention thus achieves truly "one touch" merchandising.

Figure 5:
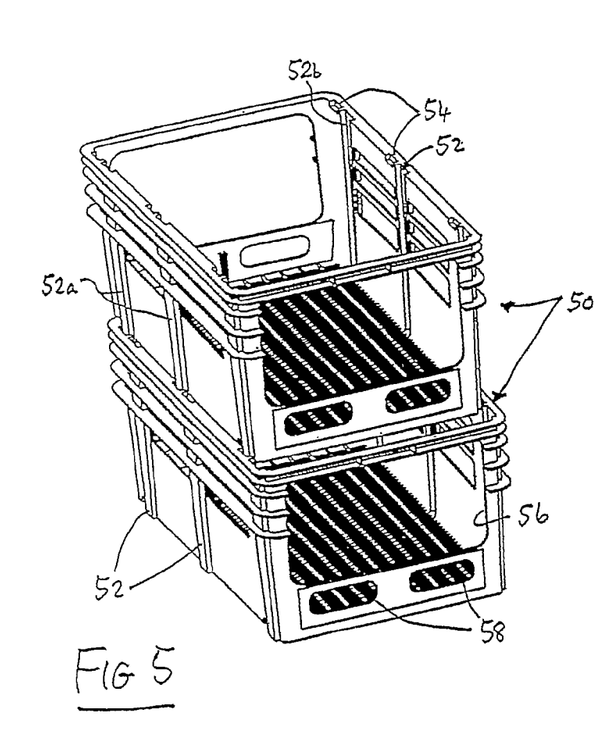
FIG. 5 is another view of a stacked pair of the crates.
Figure 6:
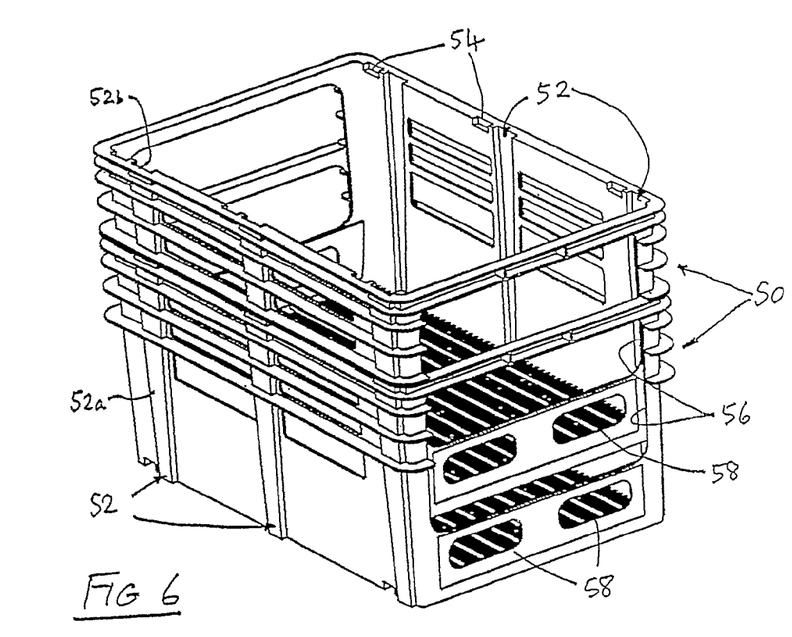
FIG. 6 is a view of a pair of the crates in a nested configuration.
Figure 7:
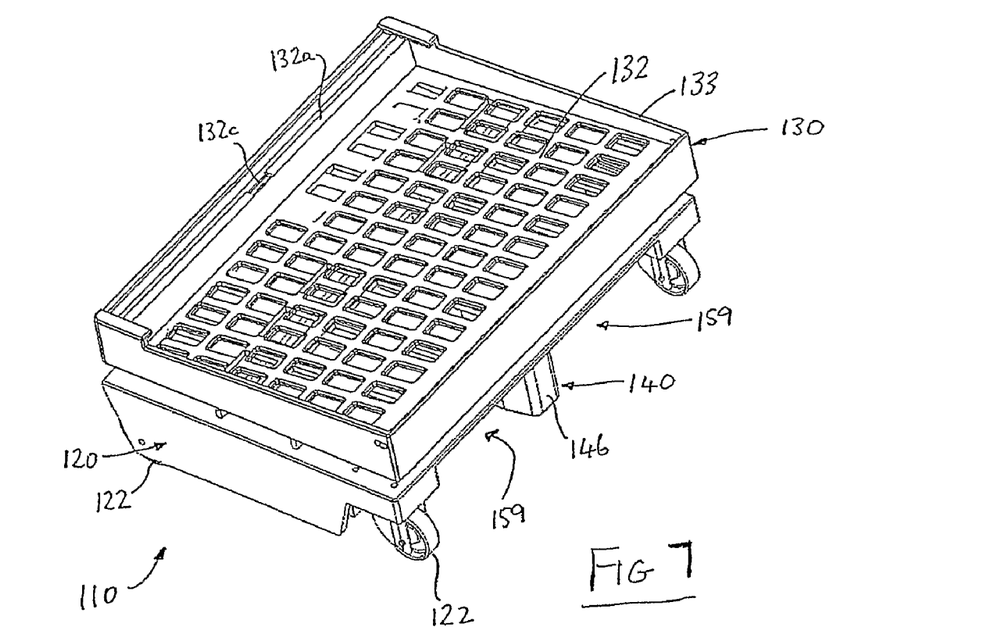
FIG. 7 is a perspective view of product transportation apparatus according to a second embodiment of the invention, shown with its cradle platform tilted.
Figure 8:
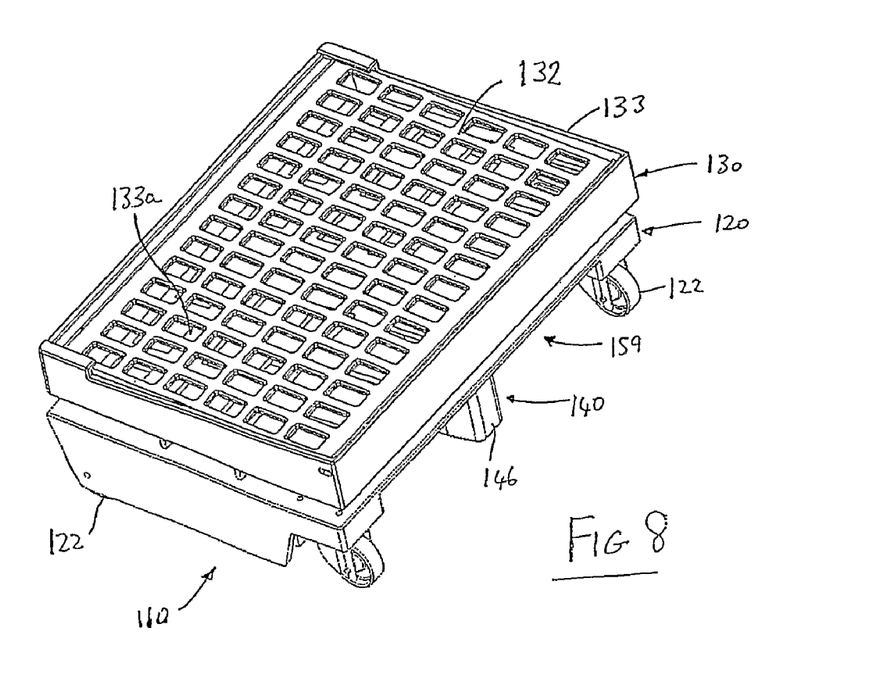
FIG. 8 is a view similar to FIG. 7, showing the cradle platform horizontal.
Figure 9:
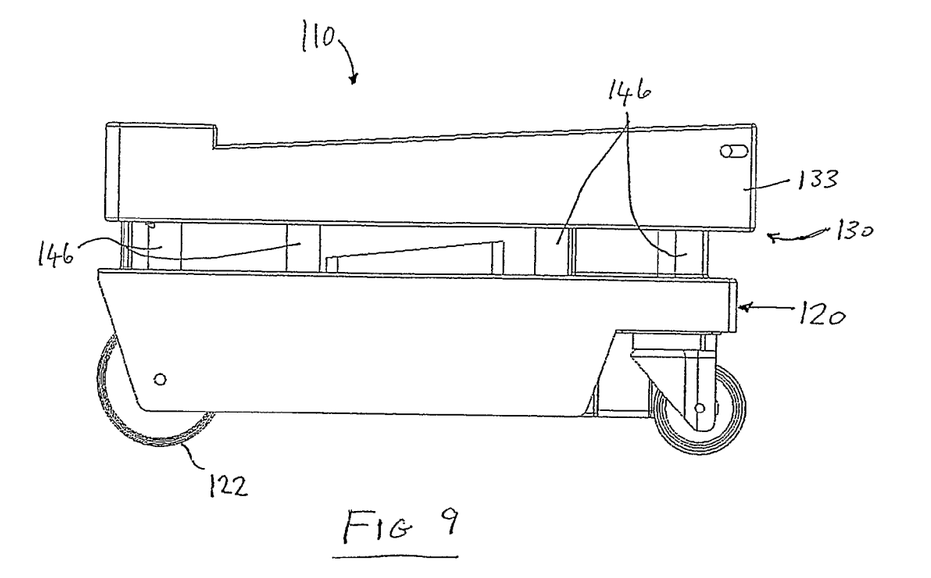
FIGS. 9 and 10 are side views corresponding to FIGS. 7 and 8, respectively showing the assembly of the support structure and ground engageable member in their relatively elevated and lowered conditions.
Figure 10:
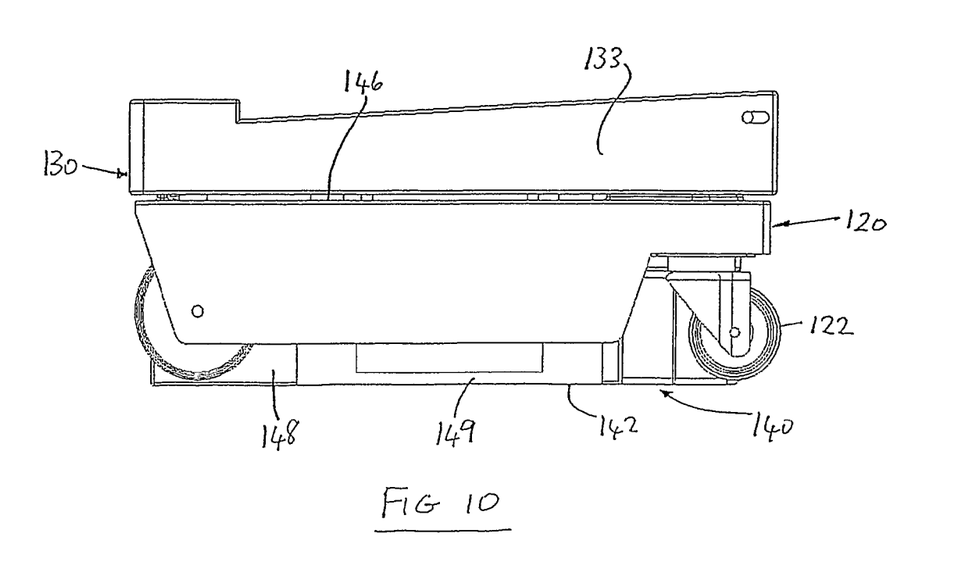

Crates 50 are designed to be offset from each other vertically when stacked as depicted in FIGS. 2 and 5 to ensure that gravity feed is achieved while having all the open fronts of the crates line up and retaining the stack within a standard footprint. By being moved slightly forwardly, each crate can then be dropped into and nested in the crate below, as depicted in FIG. 6. This is achieved by providing the side walls of the crates with vertically tapered flutes 52 that define ribs 52a on the outside receivable within correspondingly tapered recesses 52b defined by the flutes 52 on the inside of an underlying crate. At the top edge of each crate, just rearwardly of each flute, is a seat recess 54 to seat the bottom edge of a respective flute 52 and so define the offset stacked position (FIG. 5). Crates 50 also are entirely symmetrical about a transverse centre line so that they can be orientated either way. They have large access openings 56 at each end to allow customers to reach in and retrieve product, and smaller underlying openings 58 for viewing brand or product information. The floor of each crate has a suitable rib and slip treatment to encourage gravity-feed of product.

The angle of inclination of platform 32 depends on the nature of the product. For example, it is typically 7.5° for milk cartons.

A second embodiment of product transportation apparatus 110 according to the invention is illustrated in FIGS. 7 to 14, in which like parts are indicated by like reference numerals preceded by a 1. The principal functional difference in the structure of this embodiment relative to the first lies in the arrangements for latching the elevated position of the support structure 130 and the ground engageable member 140 with respect to the wheeled chassis 120.

Figure 11:
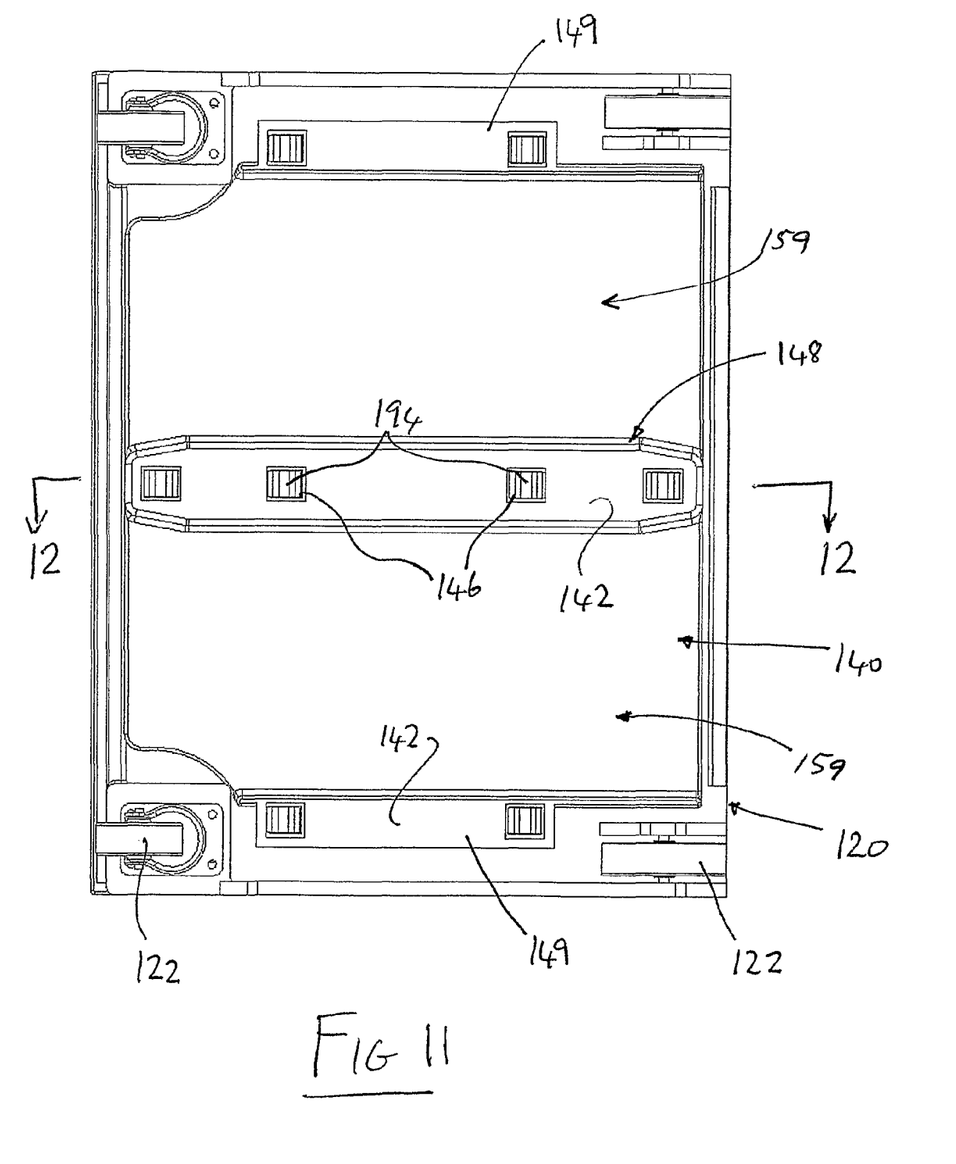
FIG. 11 is an underneath view of the second embodiment.
Figure 12:
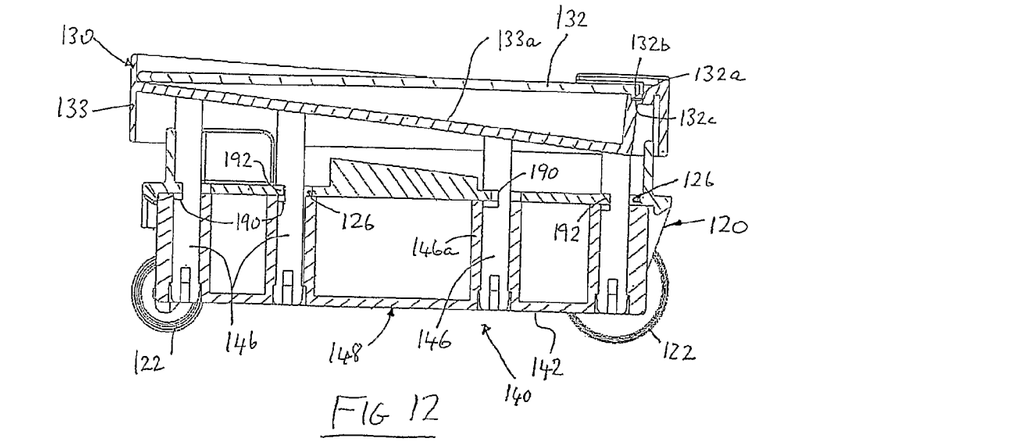
FIGS. 12 to 14 are corresponding cross-section views on the line 12-12 in FIG. 11, depicting successive operational conditions of the apparatus.
Figure 13:
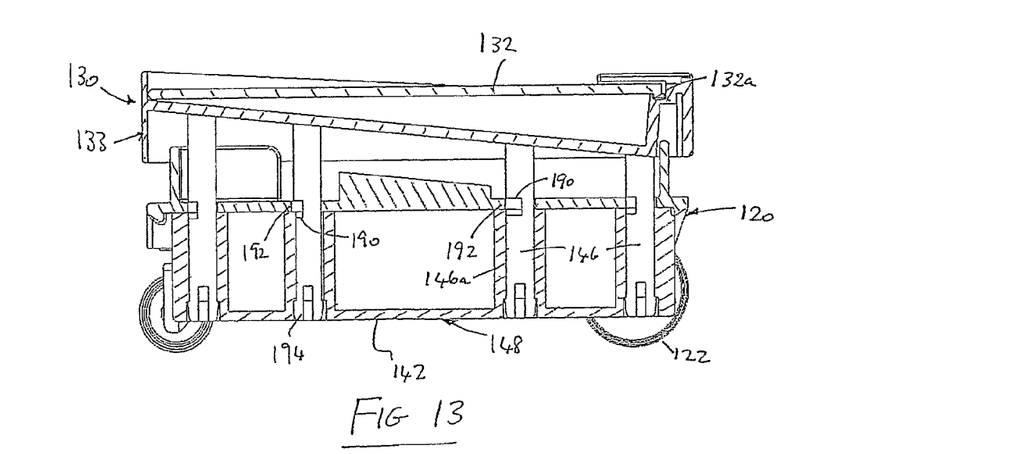
Figure 14:
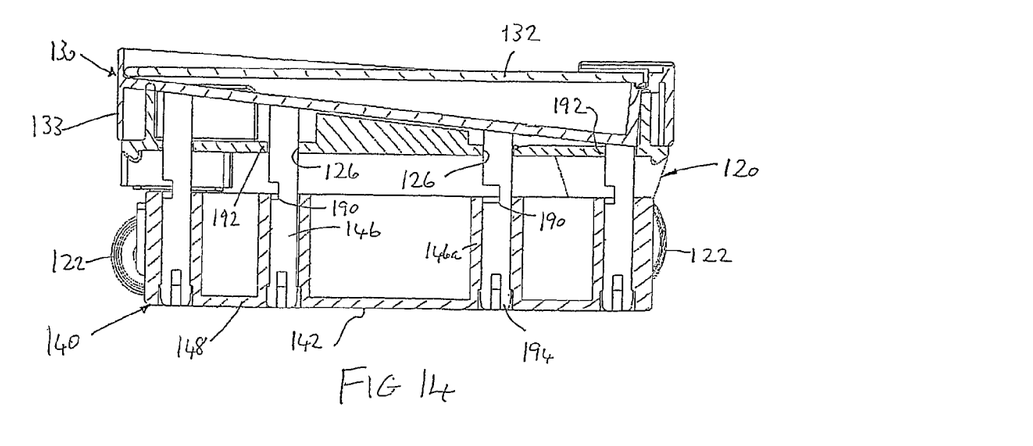

In this embodiment, the link between the crate support structure 130 and the ground engageable member 140 comprises a number of spaced link posts 146 that project through complementary openings 126 in chassis 120 (best seen in FIGS. 12 to 14). Ground engaging member 140 does not have a baseplate but instead the webs 48, 49 of the first embodiment are substituted by hollow depending beams 148, 149. As best seen in FIG. 11, and in cross-section in FIGS. 12 to 13, central beam 148 extends from front to rear of the chassis and accommodates four of the link posts 146, which extend upwardly from within matching tubular housings 146a within the beam structure. The outer beams 149 are shorter and accommodate only two of the posts. Removeable clips 194 retain posts 146 in beams 148, 149. The bottom faces of beams 148, 149 are flat coplanar surfaces 142 that collectively rest on the ground in their lowered position.

It will be seen that the beams 148, 149 in this embodiment define between them open-ended transverse openings 159 that extend across the ground engaging member 140 for receiving the forks of a forklift or pallet jack. In this case, these fork openings 159 are open at the bottom rather than closed as in the first embodiment for handling multiple apparatus on large pallet jacks.

In the second embodiment, the cradle 133 provides additional flexibility to the use of the apparatus by having two positions for crate platform 132. The crate platform is a loose flat grid plate which can rest either on the inclined floor 133a (FIG. 12) of the cradle (the position depicted in FIG. 7) to define an inclined seating plane on which the crates can gravity feed their product forward, or between the rear edge of floor 133a and a ledge 132a at the front of cradle 133 to define a generally horizontal and level seating plane. This is the position illustrated in FIGS. 8 and 12 to 14, where it will be seen that the position is stabilised by engagement of a shallow central projection 132b on the underneath of the front edge of plate 132 with a complementary recess 132c in ledge 132a.

The latching configuration of this embodiment comprises complementary formations on link posts 146 and the openings 126 in chassis 120 through which the posts project. Each post has a rectangular cut-out 190 on a common side so that the chassis can be shifted front to rear and vice versa to engage and disengage the rims 192 of openings 126 in the cut-out 190. When this engagement is effected (FIG. 12), the assembly of ground engaging member 140 and cradle 133 is held in a relatively elevated position with respect to the chassis 120 and therefore off the underlying ground surface. If the cradle is shifted forwardly to disengage the rims 192 from within the cut-outs 190 (the position shown in FIG. 13) the assembly of ground engaging member 140 and cradle 133 is able to fall because posts 146 can descend through openings 126, to bring the assembly into contact with the ground (FIG. 14).

In this instance, it will usually be necessary to employ a forklift or pallet jack to insert its forks into openings 159 and to operate it to raise the whole apparatus 110 including the ground wheels 122 off the ground surface. The overlying load is then carried by the forks and it is an easy matter to manually shift chassis 120 between latching and unlatching position or vice versa.

To recap, the illustrated embodiments would be utilised in their "mini-pallet" position as they are loaded with product-filled crates at the manufacturing plant, assembled in groups and transported by truck to a retailer's distribution centre, and then onto the individual retail stores or supermarkets. At the supermarket loading bay, a small forklift or pallet jack would be introduced into openings 59, 159 and the min-pallets elevated from the ground. The chassis will now be in the relatively lowered position and the appropriate latching arrangement can be activated to latch this position. On lowering the forks, the apparatus will be in its dolly configuration ready to be wheeled to the display cabinet or refrigerator, where it is stabilised by actuating the foot brake.

Once the products have been taken by customers, the process is reversed for returning the apparatus to the manufacturing plant. The now empty crates will usually be nested and multiple mini-pallets 10, 110 may be stacked for optimum space utilisation.

It will also be understood that the term "comprises" (or its grammatical variants) as used in this specification is equivalent to the term "includes" and should not be taken as excluding the presence of other elements or features.

The invention claimed is:

1. Apparatus selectively configurable as a pallet or dolly, comprising:
    a body having ground wheels;
    a support structure for one or more crates or other containers holding products to be carried by the apparatus;
    at least one ground engageable member and a releasable latch to hold the at least one ground engageable member in a retracted position, wherein the releasable latch includes at least one first formation associated with the body co-operable with at least one second formation associated with the support structure, and wherein the at least one ground engageable member is fixed to the support structure to form an assembly with the support structure that is mounted to the body for vertical movement of the assembly relative to the body between the retracted position, in which the apparatus is configured as a dolly freely moveable on a ground surface via the ground wheels, and a relatively downwardly extended position, in which the at least one ground engageable member engages an underlying ground surface at a predetermined location to stabilize the apparatus against movement from the location on the ground wheels such that the assembly forms a pallet support for the one or more crates or other containers; and
    at least one transverse opening in the at least one ground engageable member to receive at least one fork of a lifting device for lifting the apparatus with the at least one ground engageable member resting on the at least one fork, thereby lifting the support structure allowing the releasable latch to slide the at least one first formation with respect to the at least one second formation for release and engagement of the releasable latch and facilitating transport of the apparatus.

2. Apparatus according to claim 1, wherein the body includes a chassis on which the ground wheels are mounted.

3. Apparatus according to claim 2, wherein the at least one ground engageable member is fixed to the support structure by linking structure extending through one or more openings in the chassis.

4. Apparatus according to claim 3, wherein the linking structure comprises a plurality of spaced posts.

5. Apparatus according to claim 3, wherein the linking structure comprises a plurality of ribs.

6. Apparatus according to claim 4, wherein the releasable latch comprises co-operable formations on one or more of the posts and on a respective opening in the body, wherein sufficient lateral movement of the body with respect to the at least one ground engageable member while the apparatus is held off the ground by a the lifting device is effective to engage and disengage the co-operable formations.

7. Apparatus according to claim 1, wherein the releasable latch comprises a hand operable latching mechanism for selectively determining at which of the retracted and extended positions the at least one ground engageable member is disposed.

8. Apparatus according to claim 7, wherein the hand operable latching mechanism comprises a slide member slidable between a first position in which it supports the at least one ground engageable member in a relatively elevated position corresponding to the retracted position of the at least one ground engageable member, and a second position in which the at least one ground engageable member is able to fall to bring the at least one ground engageable member to its downwardly extended position.

9. Apparatus according to claim 8, wherein the slide member is easily slidable between its respective positions only when the support structure and its load are supported by the lifting device.

10. Apparatus according to claim 1, wherein the support structure includes a platform that defines a seating plane for a container that is inclined to the horizontal sufficiently for products thereon to slide forward in the container under gravity as products at the front of the container are removed from the container.

11. Apparatus according to claim 10, wherein the platform is adjustable between a first position in which it defines the inclined seating plane, and a second position in which it defines a generally horizontal seating plane.

12. Apparatus according to claim 5, wherein the releasable latch comprises co-operable formations associated with the body and the one or more ribs, wherein sufficient relative lateral movement of the body with respect to the at least one ground engageable member while the apparatus is held off the ground by a the lifting device is effective to engage and disengage the co-operable formations.

13. Apparatus according to claim 3, wherein the releasable latch comprises a hand operable latching mechanism for selectively determining at which of the retracted and extended positions the at least one ground engageable member is disposed.

14. Apparatus according to claim 13, wherein the hand operable latching mechanism comprises a slide member, slidable between a first position in which it supports the at least one ground engageable member in a relatively elevated position corresponding to the retracted position of the at least one ground engageable member, and a second position in which the at least one ground engageable member is able to fall to bring the at least one ground engageable member to its downwardly extended position.

15. Apparatus according to claim 14, wherein the slide member is easily slidable between its respective positions only when the support structure and its load are supported by the lifting device.

16. Apparatus according to claim 3, wherein the support structure includes a platform that defines a seating plane for a container that is inclined to the horizontal sufficiently for products thereon to slide forward in the container under gravity as products at the front of the container are removed from the container.

17. Apparatus according to claim 16, wherein the platform is adjustable between a first position in which it defines the inclined seating plane, and a second position in which it defines a generally horizontal seating plane.

18. Apparatus according to claim 7, wherein the support structure includes a platform that defines a seating plane for a container that is inclined to the horizontal sufficiently for products thereon to slide forward in the container under gravity as products at the front of the container are removed from the container.

19. Apparatus according to claim 18, wherein the platform is adjustable between a first position in which it defines the inclined seating plane, and a second position in which it defines a generally horizontal seating plane.

20. Apparatus selectively configurable as a pallet or dolly, the apparatus comprising:
   a body having ground wheels;
   a support structure for one or more crates or other containers holding products to be carried by the apparatus;
   at least one ground engageable member fixed to the support structure, by linking structure comprising a plurality of spaced posts extending through openings in the body, to form an assembly with the support structure that is mounted to the body for vertical movement of the assembly relative to the body between a retracted position, in which the apparatus is configured as a dolly freely moveable on a ground surface by the ground wheels, and a relatively downwardly extended position in which the at least one ground engageable member engages an underlying ground surface at a predetermined location to stabilize the apparatus against movement from the location on the ground wheels, whereby the same assembly becomes a pallet support for said one or more crates or other containers;
   at least one transverse opening in the at least one ground engageable member to receive at least one fork of a lifting device for lifting the apparatus with the at least one ground engageable member resting on the at least one fork, thereby facilitating transport of the apparatus and release and engagement of a releasable latch; and
   wherein the releasable latch includes a cut-out in the posts and formations extending into the openings, wherein sufficient lateral movement of the body with respect to the at least one ground engageable member while the apparatus is held off the ground by the lifting device is effective to engage and disengage the co-operable formations.

21. Apparatus according to claim 20, wherein the releasable latch comprises a hand operable latching mechanism for selectively determining at which of the retracted and extended positions the at least one ground engageable member is disposed.

22. Apparatus according to claim 20, wherein the support structure includes a platform that defines a seating plane for a crate, tray or other container that is inclined to the horizontal sufficiently for products thereon to slide forward in the container under gravity as products at the front of the container are removed from the container.

23. Apparatus selectively configurable as a pallet or dolly, the apparatus comprising:
   a body having ground wheels;
   a support structure for one or more crates or other containers holding products to be carried by the apparatus;
   at least one ground engageable member fixed to the support structure, by linking structure comprising a plurality of ribs extending through openings in the body, to form an assembly with the support structure that is mounted to the body for vertical movement of the assembly relative to the body between a retracted position, in which the apparatus is configured as a dolly freely moveable on a ground surface by the ground wheels, and a relatively downwardly extended position, in which the at least one ground engageable member engages an underlying ground surface at a predetermined location to stabilize the apparatus against movement from the location on the ground wheels such that the same assembly becomes a pallet support for said one or more crates or other containers; and
   at least one transverse opening in the at least one ground engageable member to receive at least one fork of a lifting device, for lifting the apparatus with the at least one ground engageable member resting on the at least one fork, thereby facilitating transport of the apparatus and release and engagement of a releasable latch;
   wherein the releasable latch includes co-operable formations associated with the body and associated with the ribs, and wherein sufficient relative lateral movement of the body with respect to the at least one ground engageable member, while the apparatus is held off the ground by the lifting device, is effective to engage and disengage the co-operable formations.

24. Apparatus according to claim 23, wherein the releasable latch comprises a hand operable latching mechanism for selectively determining at which of the retracted and extended positions the at least one ground engageable member is disposed.

25. Apparatus according to claim 23, wherein the support structure includes a platform that defines a seating plane for a crate, tray or other container that is inclined to the horizontal sufficiently for products thereon to slide forward in a container under gravity as products at the front of container are removed from the container.

* * * * *